(12) United States Patent
Han et al.

(10) Patent No.: US 9,007,183 B2
(45) Date of Patent: Apr. 14, 2015

(54) TERMINAL HAVING RADIO FREQUENCY FUNCTION AND METHOD OF PROCESSING INFORMATION OF THE TERMINAL

(71) Applicant: Samsung Electronics Co., Ltd., Suwon-si (KR)

(72) Inventors: Sang-jun Han, Seoul (KR); Dae-Hyun Kim, Suwon-si (KR); Bo-mi Kim, Yongin-si (KR); Bo-hyun Kyung, Yongin-si (KR); Myoung-soon Choi, Yongin-si (KR); Kuk-hyun Han, Suwon-si (KR); Pil-seung Yang, Suwon-si (KR); Hark-joon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/188,249

(22) Filed: Feb. 24, 2014

(65) Prior Publication Data

US 2014/0167926 A1 Jun. 19, 2014

Related U.S. Application Data

(63) Continuation of application No. 12/190,635, filed on Aug. 13, 2008, now Pat. No. 8,686,834.

(60) Provisional application No. 60/989,243, filed on Nov. 20, 2007.

(30) Foreign Application Priority Data

Mar. 21, 2008 (KR) .......................... 10-2008-0026265

(51) Int. Cl.
*H04Q 5/22* (2006.01)
*G06K 7/10* (2006.01)
*G06F 3/0481* (2013.01)

(52) U.S. Cl.
CPC ........ *G06K 7/10366* (2013.01); *G06F 3/04817* (2013.01); *H04Q 2213/13095* (2013.01)

(58) Field of Classification Search
USPC .......................... 340/10.1–10.6, 572.1–572.9; 235/375–385; 455/456.6, 457
See application file for complete search history.

(56) References Cited

U.S. PATENT DOCUMENTS 5,367,625 A 11/1994 Ishitani
6,191,807 B1 * 2/2001 Hamada et al. ............ 348/14.07
(Continued)

FOREIGN PATENT DOCUMENTS

CN 1381781 A 11/2002
EP 1830558 A1 9/2007
(Continued)

OTHER PUBLICATIONS

Communication issued Aug. 13, 2012 by the State Intellectual Property Office of the People's Republic of China in counterpart Chinese Application No. 200810176730.1.
(Continued)

*Primary Examiner* — Kerri McNally
*Assistant Examiner* — Paul Obiniyi
(74) *Attorney, Agent, or Firm* — Sughrue Mion, PLLC

(57) ABSTRACT

Provided are a terminal having a radio frequency identification (RFID) function and a method of processing information of the terminal for allowing intuitive interaction between a screen manipulation and an RFID manipulation with respect to using an RFID related service. The method of processing the information of the terminal including a screen and an RFID recognition unit, includes detecting a screen area corresponding to a position of the RFID recognition unit disposed at a predetermined position of the screen; displaying an RFID icon at a position of the detected screen area; recording information in an RFID tag based on the RFID tag contacting the RFID icon, and recognizing the information from the RFID tag the RFID tag contacting the RFID icon.

10 Claims, 9 Drawing Sheets

(56) References Cited

U.S. PATENT DOCUMENTS

| | | | |
|---|---|---|---|
| 6,317,739 B1* | 11/2001 | Hirata et al. ............... | 1/1 |
| 6,380,930 B1* | 4/2002 | Van Ruymbeke ............ | 345/173 |
| 6,768,419 B2* | 7/2004 | Garber et al. ............... | 340/572.4 |
| 7,035,814 B2* | 4/2006 | Malkin et al. ............... | 705/23 |
| 7,161,470 B2* | 1/2007 | Berquist et al. ............ | 340/10.31 |
| 7,406,167 B2* | 7/2008 | Ooki ........................... | 379/242 |
| 7,567,219 B2* | 7/2009 | Mori et al. .................. | 345/1.1 |
| 7,928,965 B2* | 4/2011 | Rosenblatt et al. ......... | 345/173 |
| 2001/0008390 A1* | 7/2001 | Berquist et al. ............ | 340/10.31 |
| 2002/0156829 A1* | 10/2002 | Yoshimine ................. | 709/201 |
| 2002/0163534 A1 | 11/2002 | Choi et al. | |
| 2002/0178007 A1* | 11/2002 | Slotznick et al. .......... | 704/270.1 |
| 2003/0066047 A1* | 4/2003 | Watase ....................... | 717/100 |
| 2004/0139400 A1* | 7/2004 | Allam et al. ................ | 715/526 |
| 2006/0080310 A1* | 4/2006 | Gordon et al. .............. | 707/4 |
| 2006/0128408 A1* | 6/2006 | Perttila et al. .............. | 455/466 |
| 2006/0238502 A1* | 10/2006 | Kanamori et al. .......... | 345/156 |
| 2006/0282324 A1* | 12/2006 | Mori et al. .................. | 705/14 |
| 2007/0011893 A1* | 1/2007 | Garber et al. ............... | 33/286 |
| 2007/0157097 A1* | 7/2007 | Peters ......................... | 715/764 |
| 2007/0195364 A1* | 8/2007 | Umehara et al. ........... | 358/1.15 |
| 2008/0203166 A1* | 8/2008 | Skaaksrud et al. ......... | 235/462.1 |
| 2008/0252456 A1* | 10/2008 | Tjebben ...................... | 340/572.1 |
| 2008/0285091 A1* | 11/2008 | Skaaksrud et al. ......... | 358/473 |
| 2009/0059175 A1* | 3/2009 | Le Quesne et al. ......... | 353/28 |

FOREIGN PATENT DOCUMENTS

| | | |
|---|---|---|
| GB | 2313739 A | 12/1997 |
| KR | 20020068078 | 8/2002 |

OTHER PUBLICATIONS

Communication, dated Nov. 28, 2013, issued by the Korean Intellectual Property Office in counterpart Korean Patent Application No. 10-2008-0029326.

Notice of Allowance issued Apr. 21, 2014 by the Korean Intellectual Property Office in counterpart Korean Patent Application No. 10-2008-0026265.

* cited by examiner

TERMINAL HAVING RADIO FREQUENCY FUNCTION AND METHOD OF PROCESSING INFORMATION OF THE TERMINAL

CROSS-REFERENCE TO RELATED PATENT APPLICATION

This application is a continuation application of U.S. application Ser. No. 12/190,635, filed Aug. 13, 2008, which claims priority from U.S. Provisional Application No. 60/989,243, filed on Nov. 20, 2007 in the U.S. Patent and Trademark Office, and Korean Patent Application No. 10-2008-0026265, filed on Mar. 21, 2008 in the Korean Intellectual Property Office, the disclosures of which are incorporated herein their entirety by reference.

BACKGROUND OF THE INVENTION

1. Field of the Invention

Apparatuses and methods consistent with the present invention relate to a terminal system having a radio frequency identification (RFID) function, and more particularly, to a terminal having an RFID function and a method of processing information of the terminal to allow intuitive interaction between a screen manipulation and an RFID manipulation with respect to using an RFID related service.

2. Description of the Related Art

In general, RFID is an automatic recognition technology for transceiving predetermined data stored in a label, a card, a tag, and the like having a microchip, with a reader by using a wireless frequency.

A terminal employing such an RFID function can be applied to a prepayment bus-card, a parking lot pass, an admission card in a laboratory, and the like.

RFID is performed according to an RF signal exchange between an RFID recognizer and an RFID tag. That is, when the RFID tag outputs a tag identification (ID) in the form of an RF signal, the RFID recognizer receives and confirms the tag ID.

Thus, a related art RFID terminal is generally formed of a screen unit 110 and an RFID recognition unit 120.

However, as illustrated in FIG. 1, the screen unit 110 and the RFID recognition unit 120 are provided at separate positions.

Thus, the related art RFID terminal discontinues an interaction between a screen manipulation and an RFID manipulation.

For example, the related art RFID terminal recognizes information recorded in the RFID tag via the RFID recognition unit 120, and displays the recognized information on the screen unit 110.

Thus, a user experiences inconvenience with respect to manipulation of information since the user has to separately manipulate the screen 110 and the RFID recognition unit 120 of the conventional RFID terminal.

SUMMARY OF THE INVENTION

The present invention provides a terminal having an RFID function, which allows constant interaction between a screen manipulation and an RFID recognizer manipulation in an RFID terminal system.

The present invention also provides a method of processing information of a terminal realizing an intuitive interface between a terminal having an RFID function and an RFID tag.

According to an aspect of the present invention, there is provided a method of processing information of a terminal including a screen and an RFID recognition unit, the method including: detecting a screen area corresponding to a position of the RFID recognition unit disposed at a predetermined position of the screen; displaying an RFID icon corresponding to a mark of the RFID recognition unit at a position of the detected screen area; and recording information in an RFID tag based on the RFID icon, and recognizing the information from the RF ID tag.

According to another aspect of the present invention, there is provided a terminal having an RFID function, the terminal including: a screen unit which displays an RFID icon and information; an RFID recognition unit which is disposed at a predetermined position of the screen unit, and recognizes an RFID tag; and a control unit which detects a screen area corresponding to a position of the RFID recognition unit disposed at the predetermined position of the screen unit, displays an RFID icon corresponding to a mark of the RFID recognition unit on a position of the screen area, records contents in the RFID tag, and recognizes information of the RFID tag when the RFID tag contacts the RFID icon.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
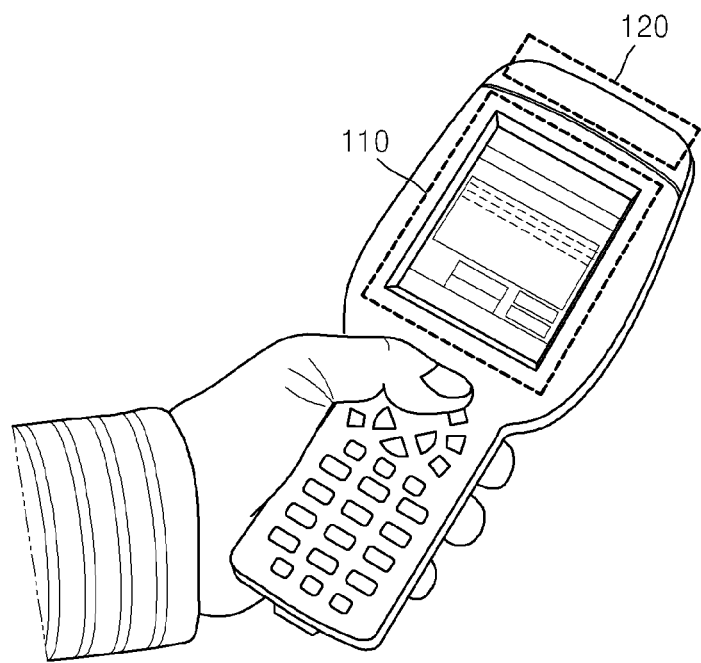
FIG. 1 is a diagram for illustrating a related art RFID terminal.
Figure 2:
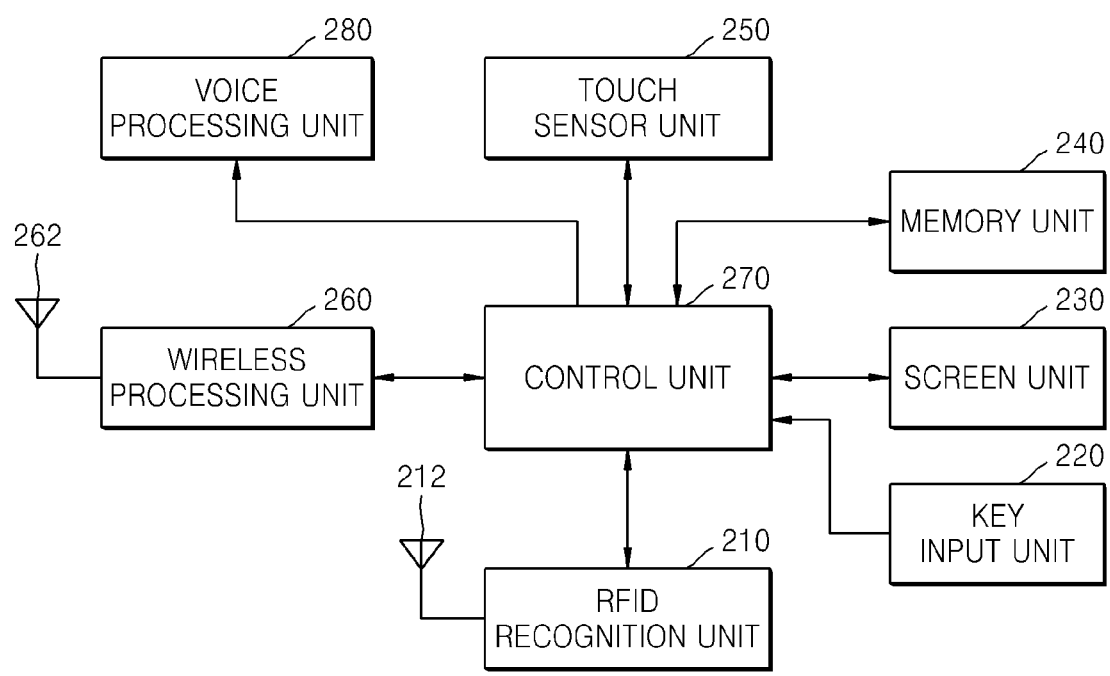
FIG. 2 is a detailed block diagram of a terminal having an RFID function according to an exemplary embodiment of the present invention.

FIG. 2 is a detailed block diagram of a terminal having an RFID function according to an exemplary embodiment of the present invention.

The terminal of FIG. 2 includes an RFID recognition unit 210, a key input unit 220, a screen unit 230, a memory unit 240, a touch sensor unit 250, a wireless processing unit 260, a control unit 270, and a voice processing unit 280.

First, the RFID recognition unit 210 is disposed at a fixed position in a lower corner of the screen unit 230. The RFID recognition unit 210 recognizes at least one of an RFID card and an RFID tag accessing the terminal via an antenna 212, obtains predetermined data stored in the RFID card or the RFID tag, and delivers the obtained predetermined data to the control unit 270. Also, the RFID recognition unit 210 switches between an information read mode or an information write mode according to an operation mode control signal output by the control unit 270.

The key input unit 220 includes a plurality of number keys and text keys, and one or more function keys. The key input unit 220 generates key data corresponding to a predetermined key when a user presses the predetermined key, and provides the key data to the control unit 270.

The screen unit 230 displays at least one of the key data generated by the key input unit 220, and various kinds of information which are extracted and generated during a control process of the control unit 270. In particular, an RFID icon corresponding to a mark of the RFID recognition unit 210 is displayed on the screen unit 230 where the RFID recognition unit 210 is disposed.

The memory unit 240 includes program code for controlling an overall operation of the terminal, and stores information input or output according to an operation of the program code. Also, the memory unit 240 may include information by which the terminal may communicate with at least one of the RFID card and the RFID tag.

The touch sensor unit 250 detects a touch or a drag on the screen unit 230 by using a sensor or the like which reacts to a pressure on the screen unit 230, wherein the touch or the drag occurs due to a user manipulation. A touch detection method used by the touch sensor unit 250 may be a pressure method or a capacitance method.

The wireless processing unit 260 converts a code generated by the control unit 270 into an RF signal, and wirelessly transmits the converted RF signal to a server or a device connected to a mobile communication network, via the antenna 262 so that the terminal performs wireless communication in a wireless network.

The control unit 270 controls and manages various functions performed by the terminal. Examples of the functions are wireless communication, wireless data transmission and reception, key input, screen display, voice output, and the like. Also, the control unit 270 includes a program for controlling and managing a boot and an operating system (OS) of the terminal, and an agent or application programs included in the terminal. In particular, the control unit 270 according to the present invention detects a screen area where the RFID recognition unit 210 is located, displays an RFID icon corresponding to a mark of the RFID recognition unit 210 on the screen area corresponding to a position of the RFID recognition unit 210, records data in the RFID tag or the RFID card based on the RFID icon, and recognizes the data from the RFID tag or the RFID card.

The voice processing unit 280 converts an RFID related message processed by the control unit 270 into a voice.

Figure 3:
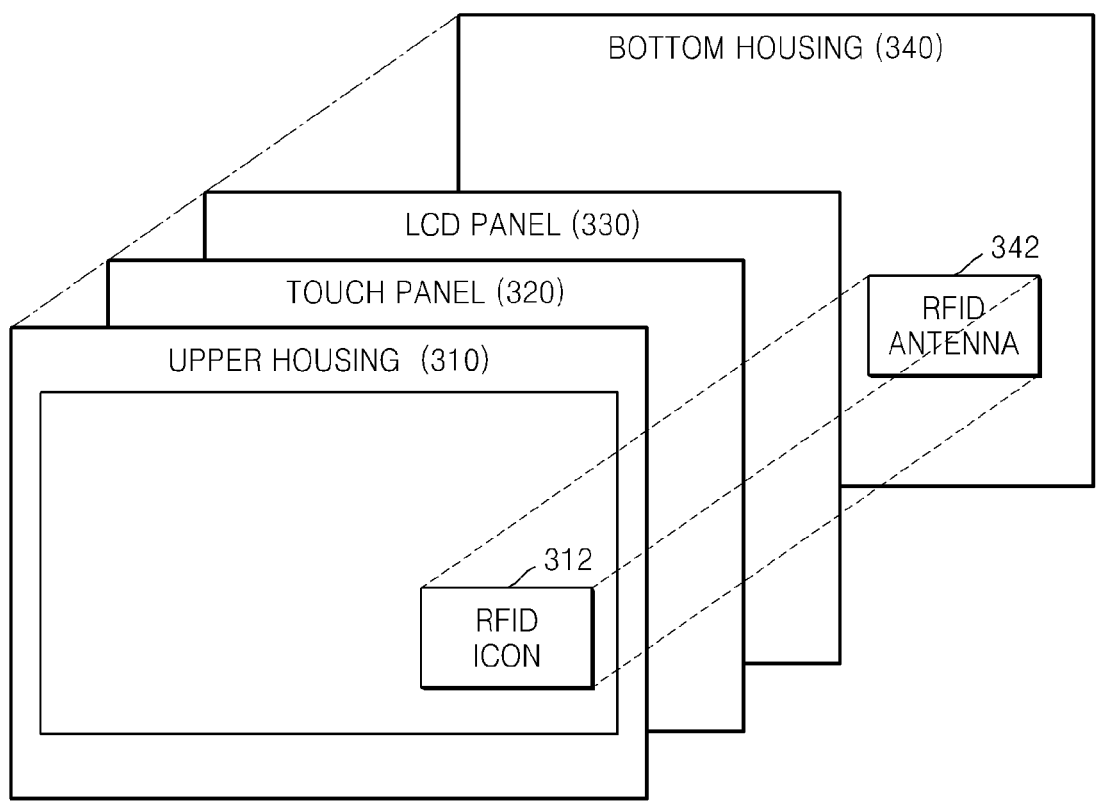
FIG. 3 is a diagram illustrating the disposition of an RFID recognition unit and a screen, and a structure of a graphic user interface (GUI) in the terminal having the RFID function.

FIG. 3 is a diagram illustrating the disposition of the RFID recognition unit 210 of FIG. 2 and the screen unit 230 of FIG. 2, and a structure of a graphic user interface (GUI) in the terminal having the RFID function.

Referring to FIG. 3, the screen is formed of an upper housing 310, a touch panel 320, a liquid crystal display (LCD) panel 330, and a bottom housing 340. The RFID recognition unit 210 is disposed at a fixed position in a lower corner of the screen. To be more specific, an antenna 342 of the RFID recognition unit 210 is disposed between the bottom housing 340 and the LCD panel 330.

An RFID icon 312 is displayed on a screen area corresponding to a position of the RFID recognition unit 210.

In this manner, a physical RFID input/output unit, and a physical position of an RFID input/output unit on the screen are matched with each other.

Figure 4:
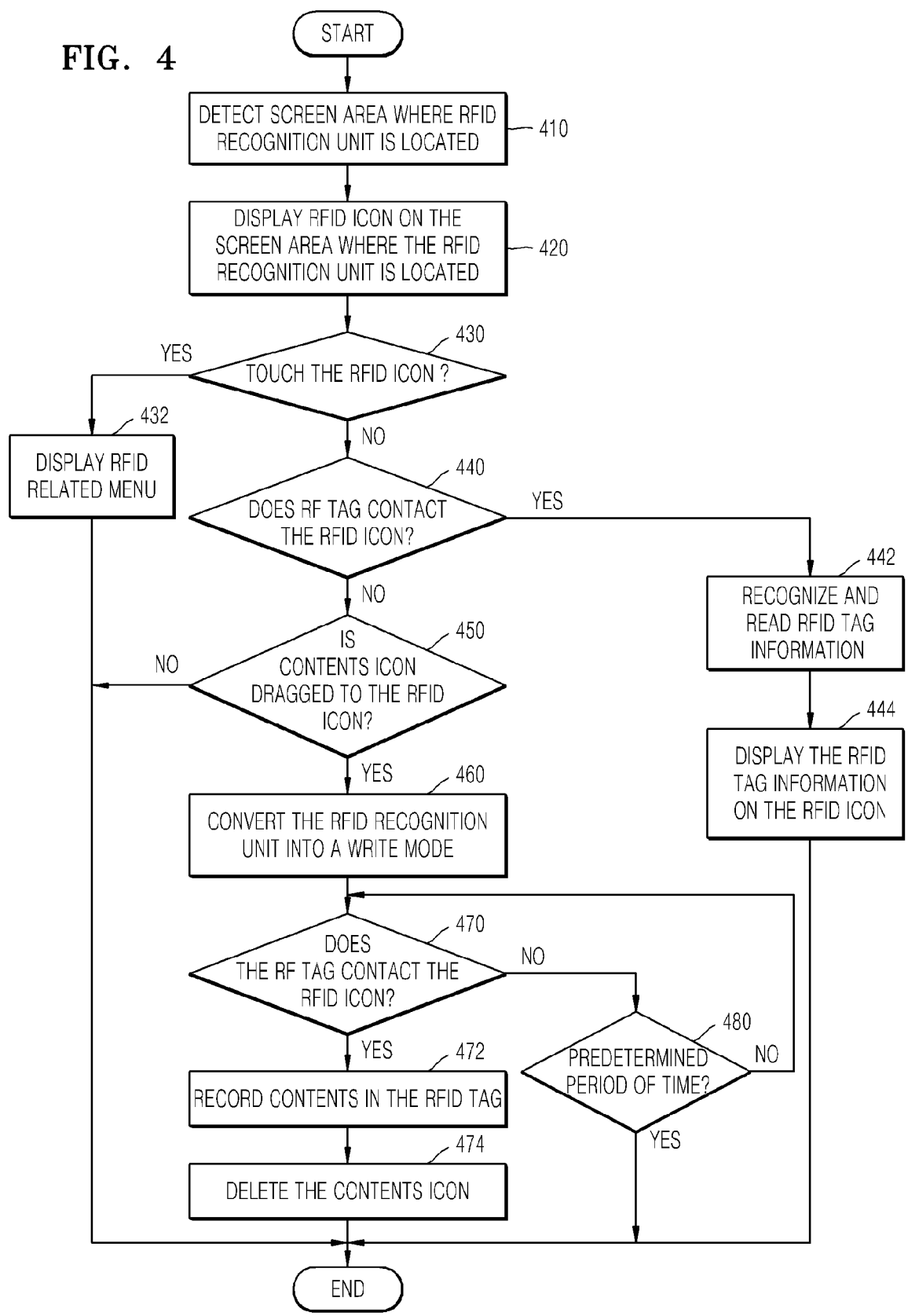
FIG. 4 is a flowchart of a method of processing information of a terminal, according to an exemplary embodiment of the present invention.

FIG. 4 is a flowchart of a method of processing information of a terminal, according to an exemplary embodiment of the present invention.

First, when the RF ID recognition unit 210 is disposed at a fixed position in a lower corner of a screen, a coordinate value of a screen area, where the RFID recognition unit 210 is located, is detected (operation 410). The coordinate value of the screen area, where the RFID recognition unit 210 is located, is preset.

Next, an RFID icon corresponding to a mark of the RFID recognition unit 210 is displayed on a position of the screen area where the RFID recognition unit 210 is located (operation 420). For example, an icon having a predetermined form is displayed by using the coordinate value of the screen area where the RFID recognition unit 210 is located. The icon may be in a graphical form or a text form.

Here, in the case where an object such as one or more fingers touches the RFID icon of the screen, the touch of the object is detected by a touch sensor or the like (operation 430).

Figure 5A:
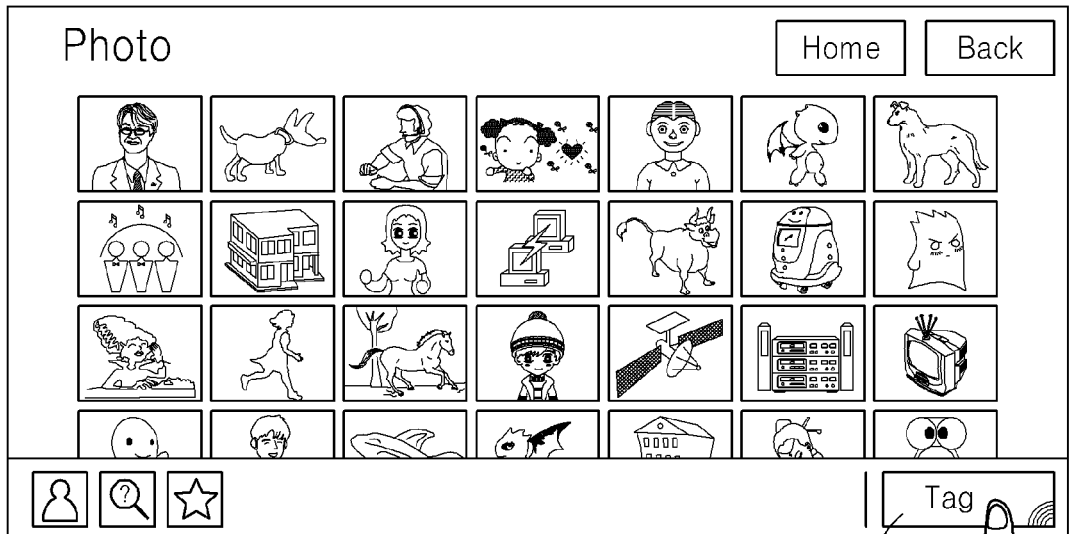
FIGS. 5A and 5B are diagrams explaining an RFID menu calling method in FIG. 4.

For example, as illustrated in FIG. 5A, a finger touches an RFID icon 510 located at a lower corner of a screen.

Next, if a touch of the object is detected, an RFID manipulation related menu is called and displayed on a screen area where the RFID icon 510 is located (operation 432).

Figure 5B:
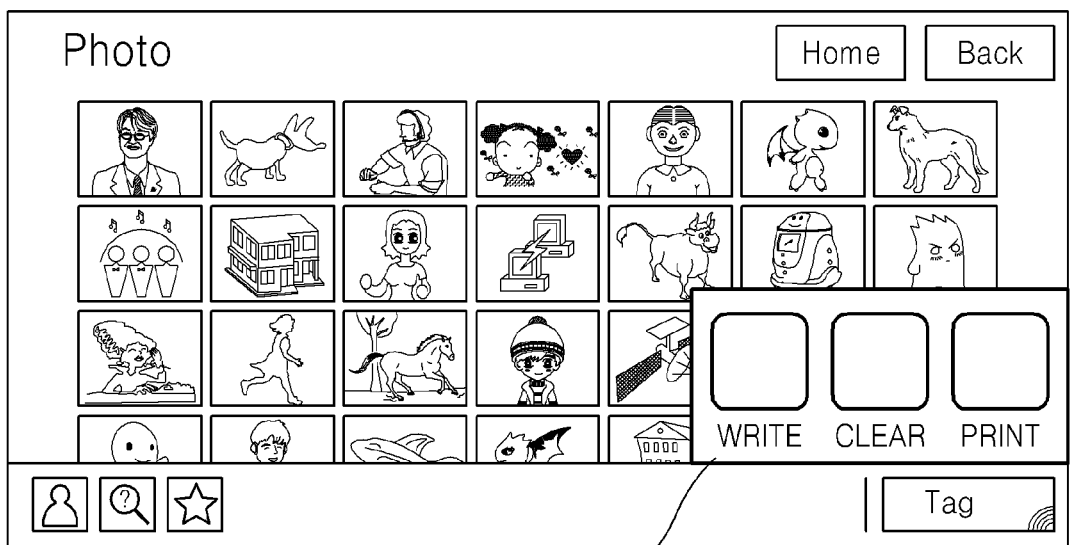

For example, as illustrated in FIG. 5B, when an object touches the RFID icon 510, an RFID manipulation related menu 520 such as "write", "clear", "print" and the like is called and displayed in the vicinity of the RFID icon 510.

Figure 6A:
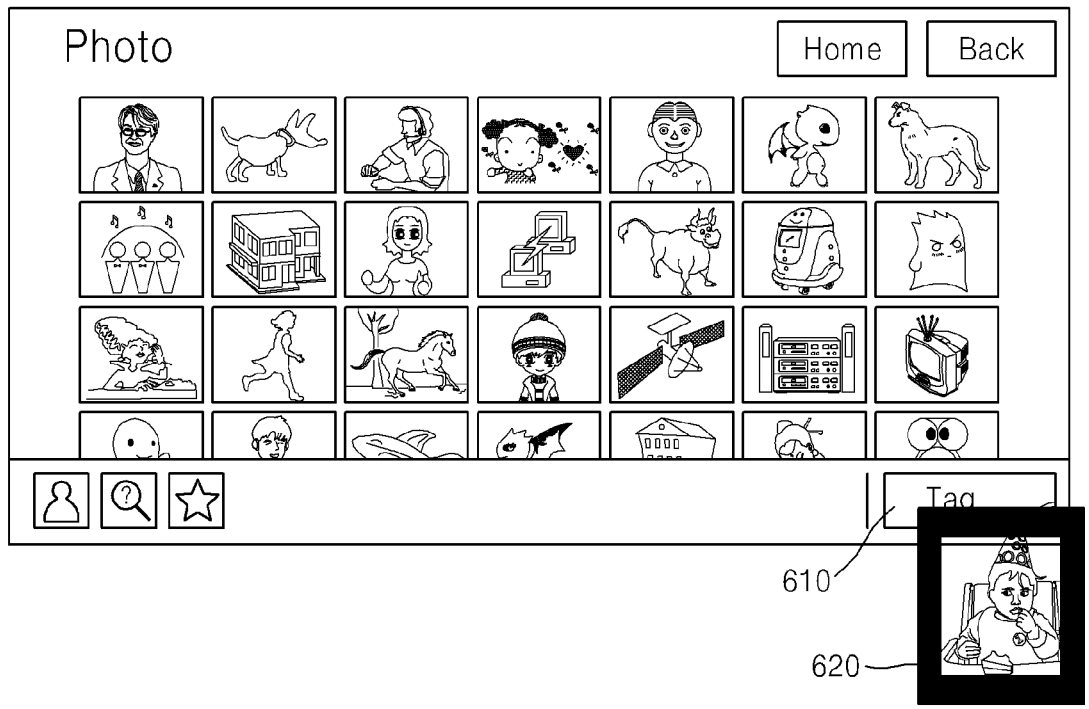
FIGS. 6A, 6B and 6C are diagrams explaining an RFID information recognition method in FIGS. 4.

Next, if a touch of the object is not detected, it is determined whether an RFID tag or an RFID card touches the RFID icon 510 (operation 440). For example, as illustrated in FIG. 6A, a user brings an RFID tag 620 into contact with an RFID icon 610.

At this time, the RFID recognition unit 210 delivers information about whether at least one of the RFID tag and the RFID card is recognized, to the control unit 270 so that it is determined whether the RFID tag or the RFID card contacts the RFID icon 510. At this time, the RFID recognition unit 210 remains in an information read mode.

Next, if it is determined that the RFID tag or the RFID card contacts the RF ID icon 510, information of the RFID tag or information of the RFID card is recognized and read (operation 442). At this time, while the information of the RFID tag is read, a predetermined message may be displayed on the RFID icon 510.

Figure 6B:

For example, as illustrated in FIG. 6B, while the information of the RFID tag is read, a message 630 having a specific form such as "Tag is being read" is displayed on the RFID icon 510.

Next, when a read operation with respect to the information of the RFID tag is completed, the read information of the RFID tag is displayed on the RFID icon 510 (operation 444).

Figure 6C:
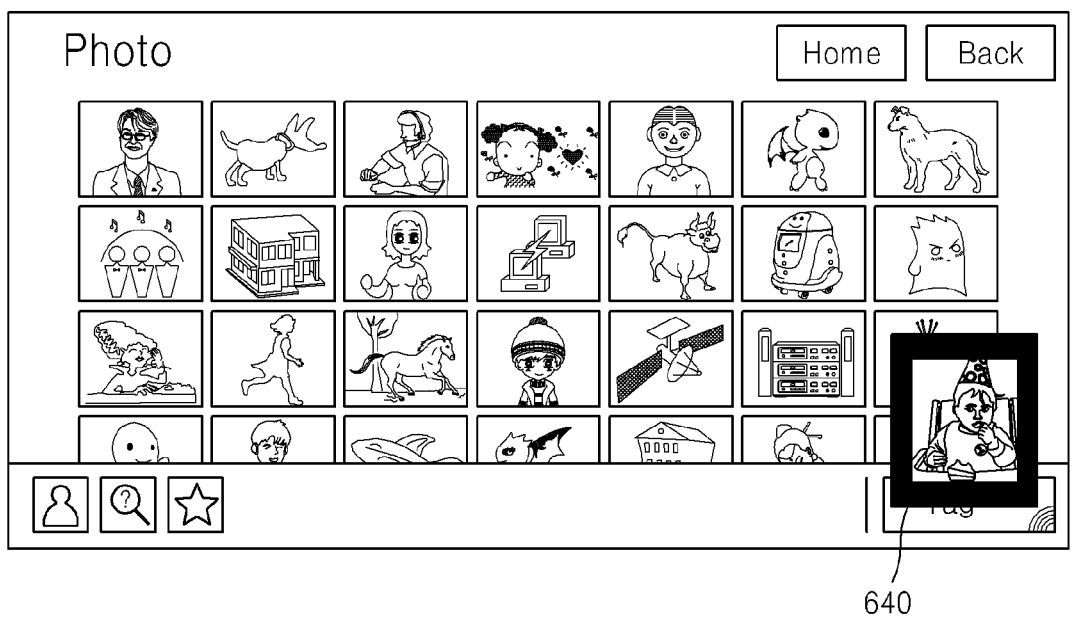

For example, as illustrated in FIG. 6C, read RFID tag information 640 is displayed on the RFID icon 510.

Meanwhile, if it is determined that the RFID tag or the RF ID card does not contact the RFID icon 510, it is determined whether the contents icon displayed on the screen is dragged to the RFID icon 510 (operation 450). A drag detection technique may be realized by using a known technique such as movement coordinates information of a touch pointer, or the like. The contents icon is mapped with multimedia contents.

Next, if a drag and drop of the contents icon onto the RFID icon 510 is detected by using the movement coordinates information of the touch pointer, the RFID recognition unit 210 switches from the information read mode to an information write mode (operation 460).

Figure 7A:
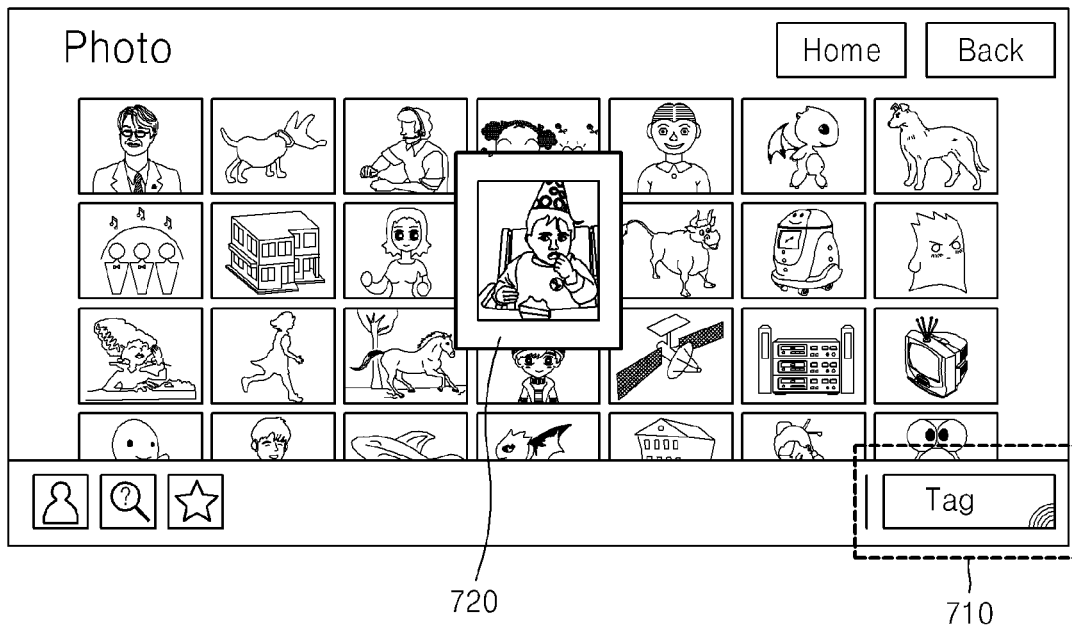
FIGS. 7A, 7B, 7C and 7D are diagrams explaining an RFID information recording method in FIG. 4.
Figure 7B:
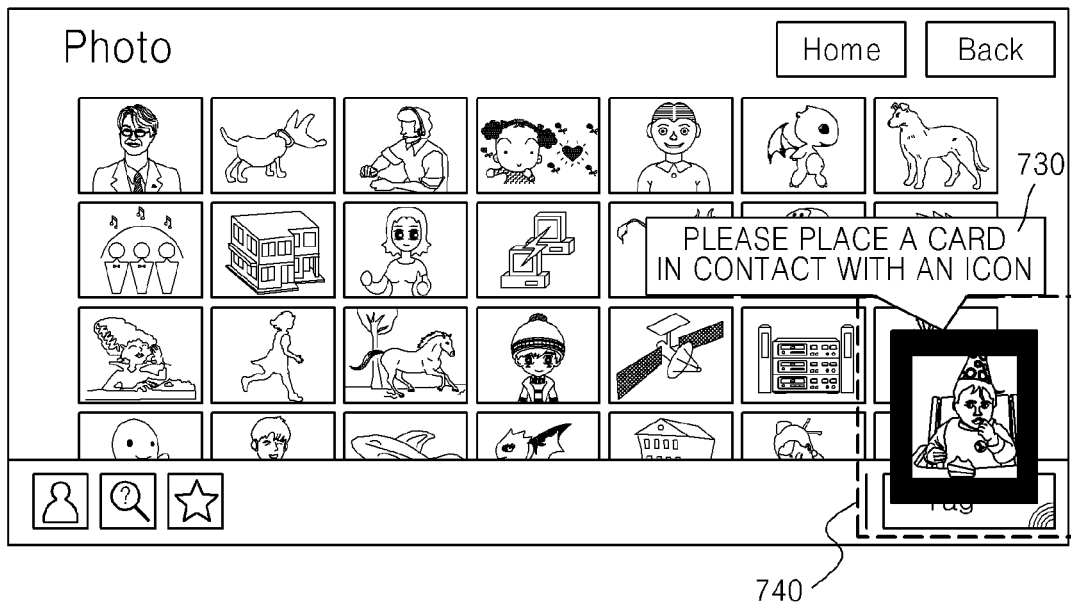

For example, as illustrated in FIG. 7A, a contents icon 720 of contents to be recorded in the RFID tag or the RFID card is selected on the screen. The contents icon 720 is dragged and dropped onto an RFID icon 710. At this time, as illustrated in FIG. 7B, when the contents icon 720 is dragged and dropped (740) onto the RFID icon 710, a card contact request message 730 such as "Please place a card in contact with an icon" is displayed on the screen.

Figure 7C:
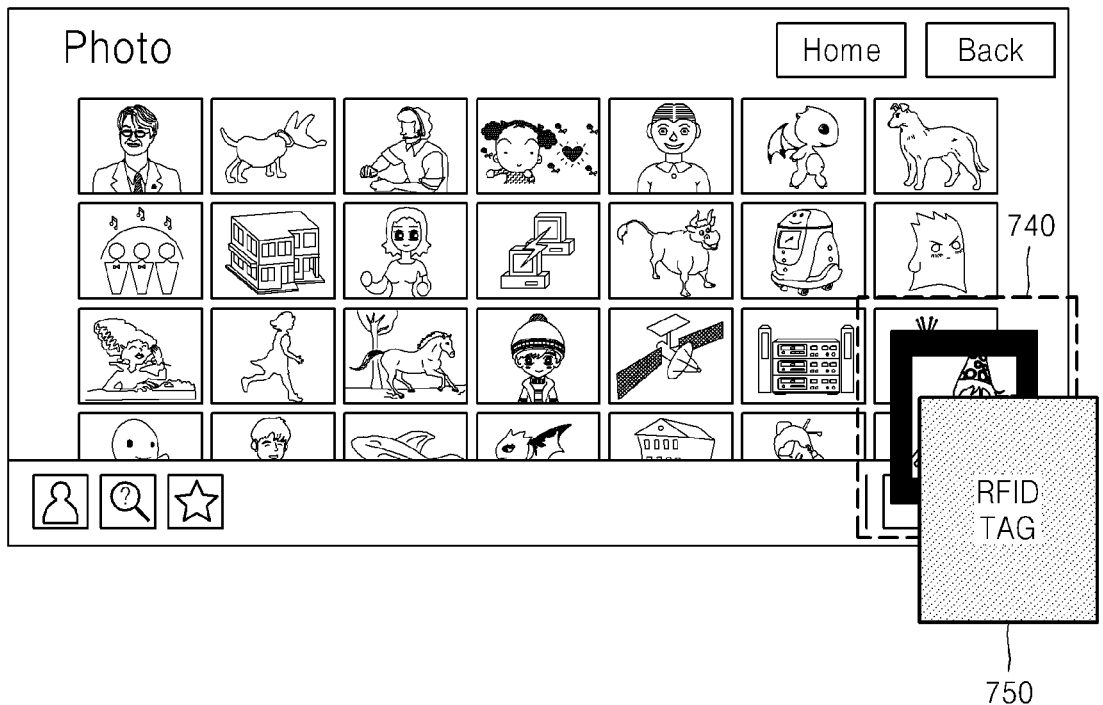

Next, it is determined whether the RFID tag or the RFID card contacts the RFID icon 710 (operation 470). For example, as illustrated in FIG. 7C, an RFID tag 750 is contacted with an area 740 where the contents icon 720 is dragged and dropped. If the RFID tag or the RFID card does not contact the RFID icon 710 during a predetermined period of time, information processing is ended (operation 480).

Next, if it is determined that the RFID tag or the RFID card contacts the RFID icon 710, the contents of the contents icon 720 dragged and dropped onto the RFID icon 710 are recorded in the RFID tag or the RFID card (operation 472).

Figure 7D:
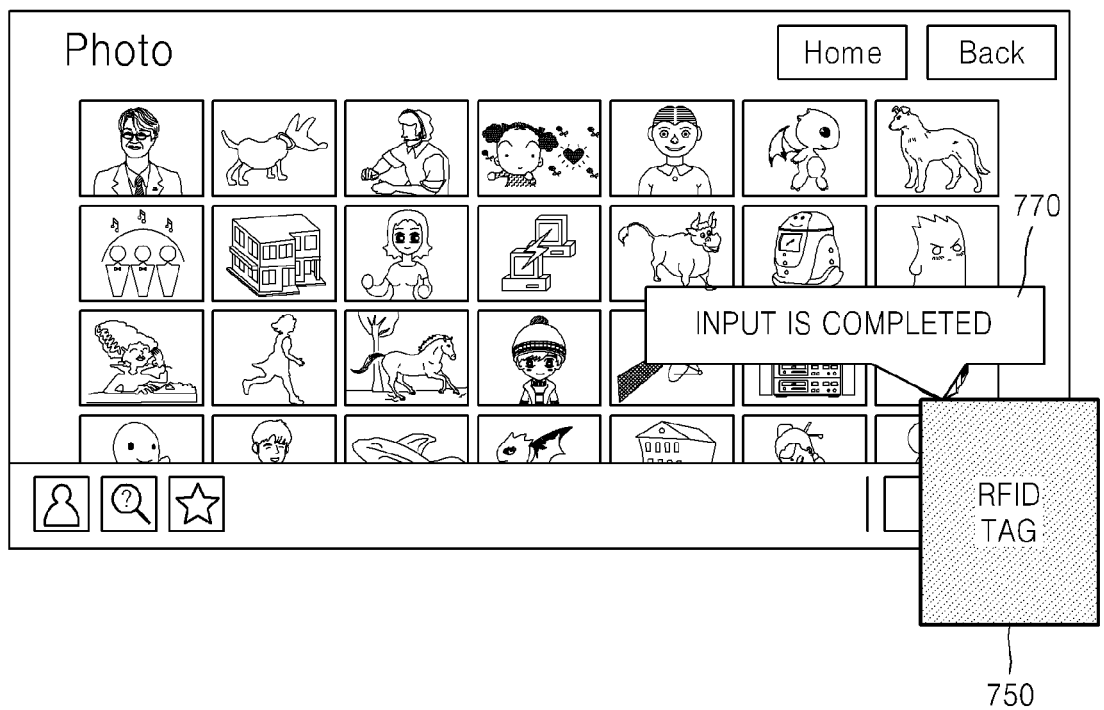

For example, as illustrated in FIG. 7D, contents of a corresponding contents icon are recorded in the RFID tag or the RFID card. When the recording operation is completed, a message 770 such as "Input is completed" is displayed on the screen.

Next, when the contents are recorded in the RFID tag or the RFID card, the corresponding contents icon is deleted (operation 474).

As described above, according to the exemplary embodiments of the present invention, a screen manipulation and an RFID recognizer manipulation, which are in an RFID terminal system, are matched with each other so that a constant interaction between the screen manipulation and the RFID recognizer manipulation can occur. Thus, the present invention can show a relationship between non-physical data shown on the screen and a physical RFID tag, and can allow intuitive interaction between the screen and an RFID recognizer. Also, the present invention can be applied to a pad-based home contents control interface.

The exemplary embodiments of the present invention can be written as computer programs and can be implemented in general-use digital computers that execute the programs using a computer readable recording medium. In addition, a data structure used in the exemplary embodiments of the present invention can be written in a computer readable recording medium through various means. Examples of the computer readable recording medium include magnetic storage media (e.g., ROM, floppy disks, hard disks, etc.), and optical recording media (e.g., CD-ROMs, or DVDs). The exemplary embodiments of the present invention can also be implemented as carrier waves (e.g., transmission through the Internet).

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of processing information of a terminal including a screen and a radio frequency identification (RFID) recognition unit, the method comprising:
   detecting a screen area corresponding to a position within the terminal of the RFID recognition unit disposed at a predetermined position of the screen;
   displaying a user interface (UI) object at a position of the detected screen area indicating the corresponding position of the RFID recognition unit within the terminal; and
   recording information in an RFID tag in response to contacting the RFID tag with the UI object indicating the corresponding position of the RFID recognition unit within the terminal, and recognizing the information from the RFID tag in response to contacting the RFID tag with the UI object indicating the corresponding position of the RFID recognition unit within the terminal.

2. The method of claim 1, further comprising displaying an RFID control related menu around the UI object in response to a touch of an object to the UI object on the screen.

3. The method of claim 2, the displaying the RFID control related menu comprises:
   detecting a touch of the object to the UI object on the screen; and
   displaying an RFID tag-write menu, an RFID tag-read menu, and an RFID tag-print menu on the screen if the touch of the object is detected.

4. The method of claim 1, wherein the recording the information comprises:
   dragging an object corresponding to contents to be recorded in the RFID tag to the UI object;
   switching the RFID recognition unit to an information write mode; and
   recording the contents corresponding to the dragged object in the RFID tag when the RFID tag contacts the UI object.

5. The method of claim 4, further comprising displaying a message requesting contact of the RFID tag on the screen if an object corresponding to contents is dragged to the UI object.

6. The method of claim 1, wherein the recognizing the information comprises:
   determining whether the RFID tag contacts the UI object;
   reading information of the RFID tag if it is determined that the RFID tag contacts the UI object; and
   displaying the read information of the RFID tag on the UI object.

7. The method of claim 6, wherein the recognizing the information further comprises displaying a message on the UI object while the information of the RFID tag is read, wherein the message indicates that tag information is being read.

8. A terminal having a radio frequency identification (RFID) function, the terminal comprising:
   a screen unit configured to display a UI object and information;
   an RFID recognition unit which is disposed within the terminal at a predetermined position of the screen unit, and configured to recognize an RFID tag; and
   a control unit configured to detect a screen area corresponding to the position within the terminal of the RFID recognition unit, display the UI object on a position of the screen area indicating the corresponding position of the RFID recognition unit within the terminal, record contents in the RFID tag in response to contacting the RFID tag with the UI object indicating the corresponding position of the RFID recognition unit within the terminal, and recognize information of the RFID tag in response to contacting the RFID tag within the UI object indicating the corresponding position of the RFID recognition unit within the terminal.

9. The terminal of claim 8, wherein the screen unit comprises a liquid crystal display (LCD) screen and the RFID recognition unit is disposed at a fixed position of a lower corner of the LCD screen.

10. The terminal of claim 8, wherein the UI object on the screen unit and an antenna of the RFID recognition unit are disposed at a same position.

* * * * *